(No Model.) 2 Sheets—Sheet 1.

J. FRY.
CORN HARVESTER.

No. 290,027. Patented Dec. 11, 1883.

WITNESSES:
H. B. Brown
A. G. Lyne.

INVENTOR:
John Fry
BY Munn & Co.
ATTORNEYS.

(No Model.)
2 Sheets—Sheet 2.

J. FRY.
CORN HARVESTER.

No. 290,027.  Patented Dec. 11, 1883.

WITNESSES:
H. B. Brown
A. S. Lyne

INVENTOR:
John Fry
BY Munn & Co
ATTORNEYS.

UNITED STATES PATENT OFFICE.

JOHN FRY, OF MOUNT JACKSON, VIRGINIA, ASSIGNOR OF THREE-FOURTHS TO JOHN M. ROMACK, DAVID G. GLENN, AND JACKSON S. CLEM, OF SAME PLACE.

CORN-HARVESTER.

SPECIFICATION forming part of Letters Patent No. 290,027, dated December 11, 1883.

Application filed June 22, 1883. (No model.)

*To all whom it may concern:*

Be it known that I, JOHN FRY, of Mount Jackson, in the county of Shenandoah and State of Virginia, have invented a new and useful Improvement in Corn-Harvesters, of which the following is a full, clear, and exact description, reference being had to the annexed drawings, forming part of this specification.

This invention relates to machines for harvesting Indian corn; and the invention consists of the novel construction hereinafter described and claimed.

Figure 1:
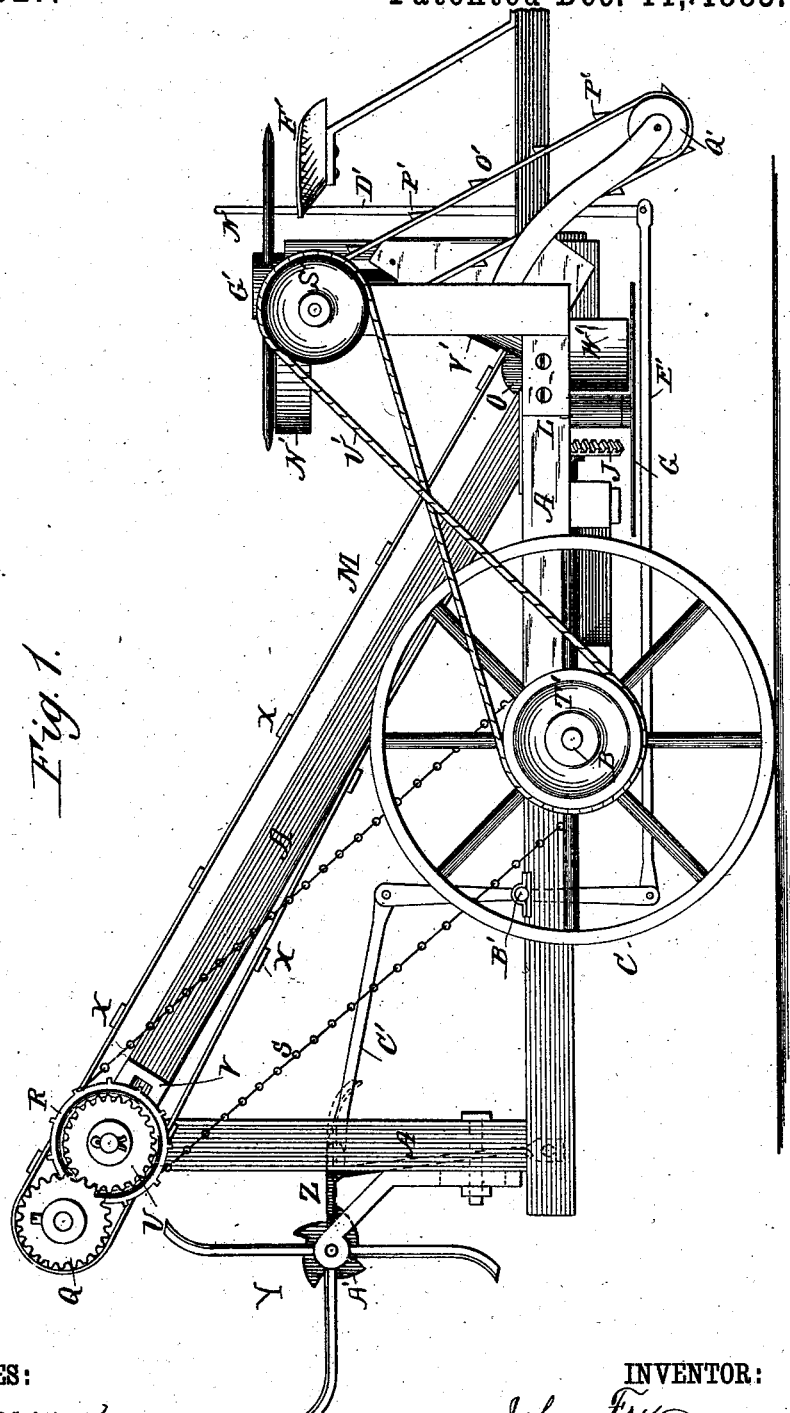
Figure 2:
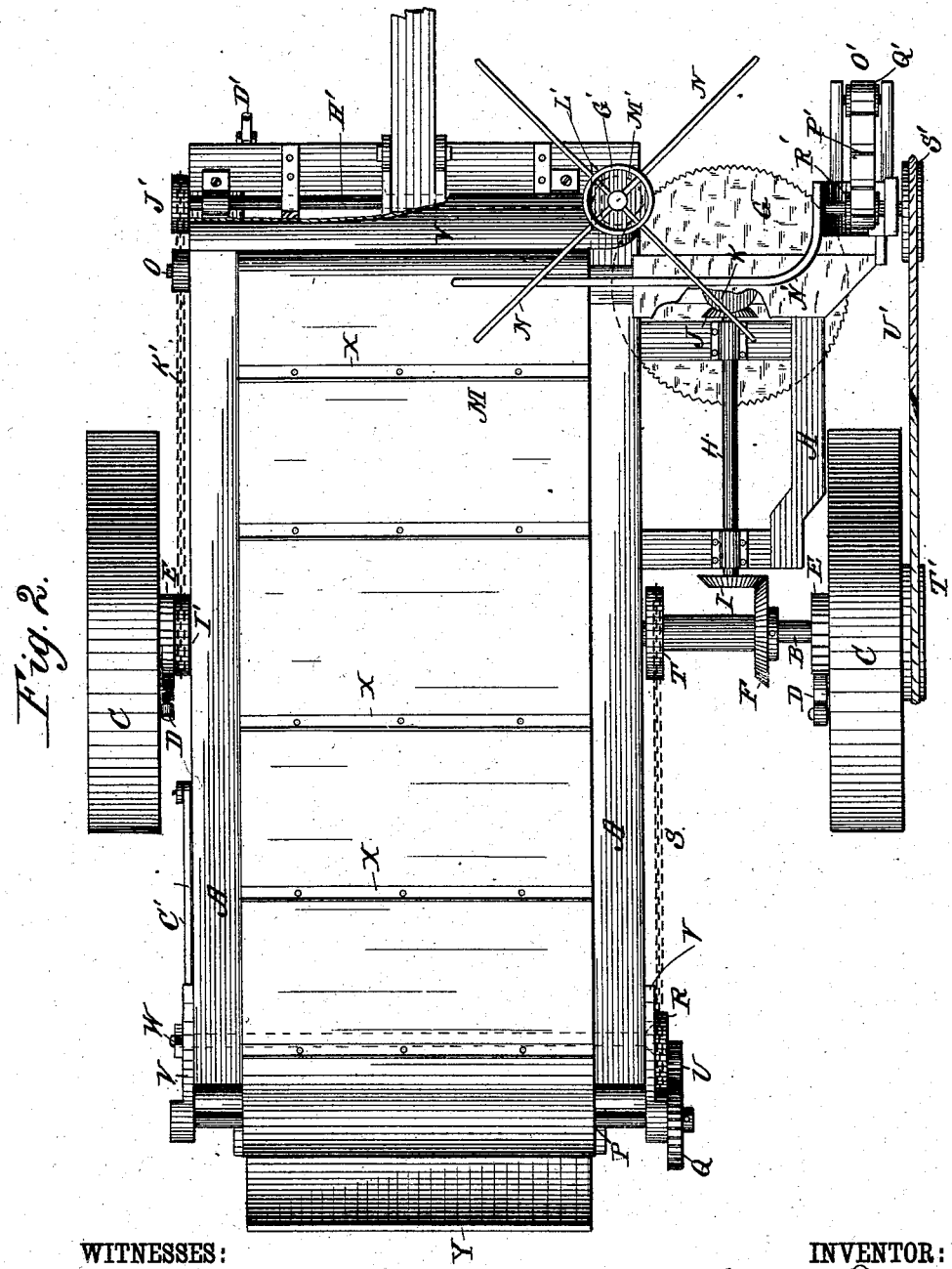

In the drawings, Figure 1 is a side elevation, and Fig. 2 is a plan view, of my corn-harvester.

A indicates the frame-work of the machine, and B is the supporting-axle, to which the wheels C are secured by the pawls D and ratchets E.

To the axle is secured a bevel-pinion, F, which drives the sickle or circular saw G by means of an intermediate shaft, H, having a bevel-pinion, I, meshing with the pinion F, and a bevel pinion, J, meshing with a bevel-pinion, K, on the saw-arbor L. This saw is located, preferably, at the right-hand side of the harvester; and at the left of the saw is a traveling apron, M, upon which the corn is to be thrown by a reel, N. This apron is carried by rollers O P, located, respectively, at the lower and upper ends of an inclined portion of the frame-work, and driven by means of a pinion, Q, on the shaft of the roller P, and a sprocket-wheel, R, connected by the chain S with a sprocket-wheel, T, on the axle B, and carrying a pinion, U, which meshes with the pinion Q. The shafts of the roller P and the sprocket-wheel R are supported in adjustable bearings V, which are held by means of a long screw-bolt, W, to give the proper tension to the apron. The apron is provided with cross-strips or carriers X, and is adapted to discharge the cornstalks into a rotary gavel-forming device, X, supported at the rear of the harvester, and held in a given position by a pawl, Z, and ratchet A'. The ratchet is released, to allow the weight of the gavel to partially rotate the device Y and discharge the gavel by means of a crank-shaft, B', connected to the spring-pawl Z by a rod, C', and to a lever, D', at the forward end of the harvester by a rod, E'. The driver, who is to occupy the seat F', will operate the lever D' to drop the gavels. The reel N is supported on a vertical shaft, G', located at the right hand of the forward end of the traveling apron, and driven by a shaft, H', which is connected to a sprocket-wheel, I', on the axle B by a sprocket-wheel, J', and chain K', and geared to the shaft G' by the bevel-pinions L' M'.

N' is a curved arm for guiding and holding the cornstalks in the arms of the reel until they are in a position for being thrown across the apron.

At the right hand, and in advance of the saw or sickle, is an endless belt, O', having projections P' secured thereon at regular intervals, and carried by pulleys Q' R', the latter of which is driven by a pulley, S', which is connected to a pulley, T', on one of the wheels C by a belt, U'.

The object of the belt O', which is inclined rearward from a vertical position, is to carry up within reach of the reel N any straggling or latterally-falling stalks.

V' is a guard for supporting the cornstalks at the lower end of the apron, and W' is a guard to prevent the lower ends of the cut stalks from slipping off the saw before being thrown upon the apron.

What I claim is—

1. In a corn-harvester, the combination of the traveling apron M, having cross-strips X, the rollers O P, adjustable bearings V, screw-bolt W, and means for driving the rollers, substantially as shown and described.

2. In a corn-harvester, the combination of the rotary gavel-forming device Y, having a ratchet, A', the spring-pawl Z, lever D', and proper connections with said pawl, substantially as shown and described.

3. In a corn-harvester, the combination, with the sickle or saw and the reel, of the rearwardly-inclined endless belt O', having projections P' thereon, and means for running said belt, and the curved arm N', substantially as shown and described.

JOHN FRY.

Witnesses:
 C. A. RINKER,
 WM. TISINGER.